United States Patent [19]

Guscott et al.

[11] Patent Number: 4,709,151

[45] Date of Patent: Nov. 24, 1987

[54] STEERABLE MIRROR ASSEMBLY AND COOPERATIVE HOUSING FOR A PASSIVE INFRARED INTRUSION DETECTION SYSTEM

[75] Inventors: John K. Guscott, Lynnfield; George Vulgaris, Sharon, both of Mass.

[73] Assignee: ADT, Inc., Parsippany, N.J.

[21] Appl. No.: 790,462

[22] Filed: Oct. 23, 1985

[51] Int. Cl.[4] ........ G01J 5/08

[52] U.S. Cl. ........ 250/342; 250/353

[58] Field of Search ........ 350/619, 636, 556, 624, 350/567, 625; 250/332, 353, 342

[56] References Cited

U.S. PATENT DOCUMENTS

| | | | |
|---|---|---|---|
| 2,958,802 | 11/1960 | Hammar et al. | 250/332 |
| 3,036,219 | 5/1962 | Thompson . | |
| 3,453,432 | 7/1969 | McHenry . | |
| 3,524,180 | 8/1970 | Cruse | 250/349 X |
| 3,551,676 | 12/1970 | Runnels . | |
| 3,631,434 | 12/1971 | Schwartz | 250/349 X |
| 3,703,718 | 11/1972 | Berman | 250/338 R |
| 3,886,360 | 5/1975 | Reiss et al. | 250/353 X |
| 4,238,675 | 12/1980 | Turlej et al. | 250/342 X |
| 4,375,034 | 2/1983 | Guscott | 250/342 |
| 4,385,833 | 5/1983 | Gardner | 250/353 X |
| 4,447,726 | 5/1984 | Mudge et al. | 250/342 |
| 4,514,631 | 4/1985 | Guscott | 250/342 |

*Primary Examiner*—Stephen C. Buczinski
*Assistant Examiner*—Linda J. Wallace
*Attorney, Agent, or Firm*—Weingarten, Schurgin, Gagnebin & Hayes

[57] ABSTRACT

The disclosed steerable mirror assembly and cooperative housing for a ceiling mountable passive infrared intrusion detection system of the present invention includes first and second relatively rotatable field forming mirrors cooperative with a focusing mirror to provide first and second substantially curtain-like fields of view at any selected pointing directions through 360° of azimuth. The field forming mirrors have a preselected non-constant radius of curvature selected to provide uniform detection sensitivity at any range within the fields of view of the several curtains. A modular housing is disclosed having cooperative, releasably assemblable components that allows ready in-the-field installation, and subsequent maintenance and troubleshooting. The housing includes a tamper switch that is operative upon an unauthorized tampering with the housing after installation to provide a signal indication of a possible system deactivization attempt.

8 Claims, 6 Drawing Figures

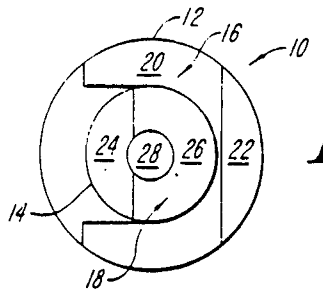
FIG. 1
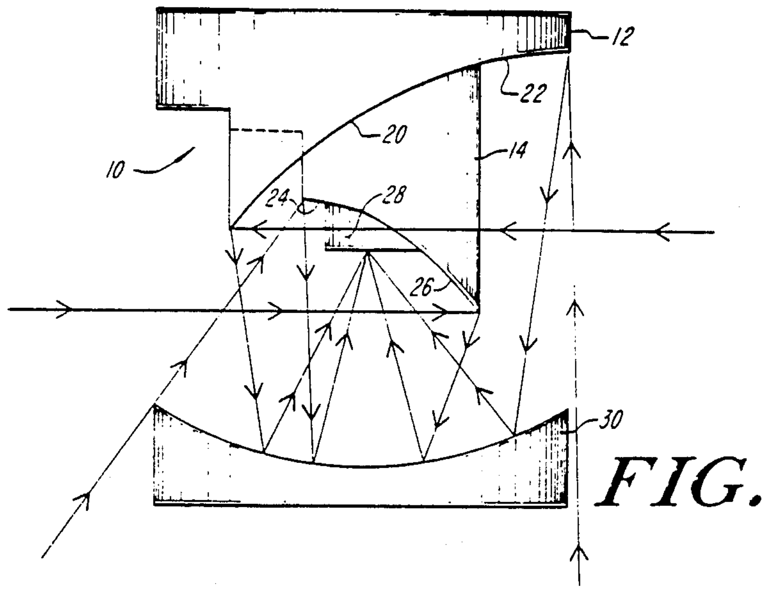
FIG. 2
FIG. 3
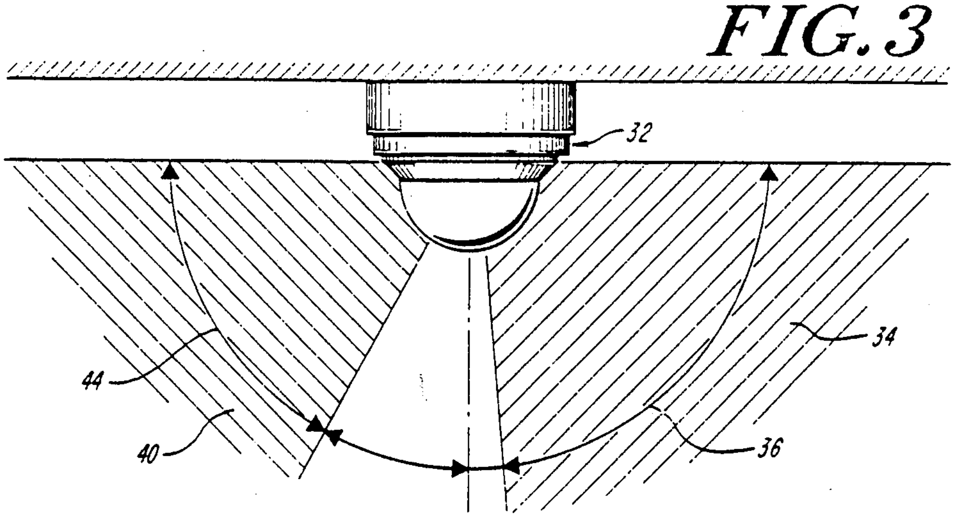

STEERABLE MIRROR ASSEMBLY AND COOPERATIVE HOUSING FOR A PASSIVE INFRARED INTRUSION DETECTION SYSTEM

FIELD OF THE INVENTION

The instant invention is directed to the field of optics, and more particularly, to a novel steerable mirror assembly and cooperative housing for a passive infrared intrusion detection system.

BACKGROUND OF THE INVENTION

Passive infrared intrusion detection systems are known for sensing the presence of an intruder in a protected space and for providing an output signal representative of intruder detection. Examples of passive infrared intrusion detection systems are shown in U.S. Pat. Nos. 3,036,219; 3,524,180; 3,631,434; 3,703,718; 3,886,360; and 4,375,034. It is an object of the present invention to provide a system and a mirror assembly therefor especially suited to ceiling mounting to produce several selectively steerable curtains through which an intruder must pass when moving through the area of a particular protected region.

SUMMARY OF THE INVENTION

The present invention discloses a miniature passive infrared detection mirror assembly that provides individually steerable vertical curtains of protection capable of being selectively steered through 360° of azimuth independently. In this way the system of the invention is readily adjusted to the layout and floor plan of each of the plurality of possible configurations, in which it is desirable to provide protection. The steerable mirror assembly of the present invention includes relatively rotatable first and second field forming mirrors so configured that the possibility of interference between the several vertical curtains is substantially eliminated. The specular surfaces of the relatively rotatable field forming mirrors have a preselected non-constant radius of curvature selected such that a uniform detection sensitivity with elevational angle is provided in the field of view of each of the vertical curtains. In the preferred embodiment, the steerable mirror assembly of the present invention is ceiling mountable, and the several curtains are independently steerable to provide that interference-free sector coverage that accommodates the requirements of each particular applications environment. An intruder present anywhere within the field of view of a corresponding curtain is thereby detected, and a high-confidence alarm signal indication thereof is therewith provided.

A housing is disclosed that cooperates with the steerable mirror assembly to allow ease of installation/maintenance and to provide for curtain orientation selection and/or adjustment. The housing includes an infrared transmissive dome and a tamper switch that is armed after installation in the protected environment to signal an alarm if any unauthorized attempt is made to remove the dome. The housing includes several cooperative housing portions that releasably interconnect to provide ease of initial installation and subsequent maintenance and/or troubleshooting.

BRIEF DESCRIPTION OF THE DRAWINGS

These and other features and attendant advantages of the present invention will become apparent as the invention becomes better understood by referring to following solely exemplary and non-limiting detailed description of a preferred embodiment thereof, and to the drawings, wherein:

FIG. 1 is a plan view illustrating the steerable mirror assembly of the present invention;

FIG. 2 is a sectional view of the steerable mirror assembly of the present invention;

FIG. 3 is a partially schematic elevational view illustrating one possible orientation of the fields of view of the present invention;

DETAILED DESCRIPTION OF A PREFERRED EMBODIMENT

Figure 4:
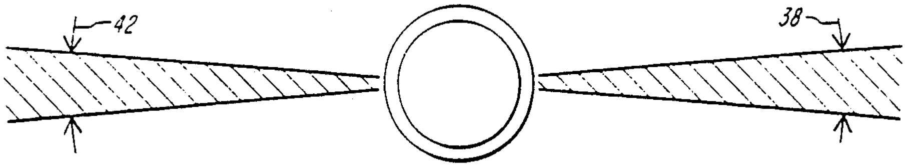
FIG. 4 is a partially schematic plan view illustrating the same orientation of the fields of view as in FIG. 3.

Referring now to FIG. 1, generally designated at 10 is a top plan view of the novel steerable mirror assembly of the present invention. The assembly 10 includes a first outer field forming mirror 12, and an inner second field forming mirror 14 journaled for rotation relative to the mirror 12. A specular surface 16 having a non-constant radius of curvature is provided on the member 12, and a specular surface 18 having a non-constant radius of curvature is provided on the member 14. The preselected non-constant radii of curvature of the surfaces 16, 18 of the members 12, 14 are selected to provide uniform detection sensitivity of a nominal man-sized target at the different elevational angles defined throughout the fields of view of the field forming mirrors. In the presently preferred embodiment, the surface 16 of the member 12 is constituted by cylindrical facets 20, 22 of selected different radii of curvature, and the specular surface 18 of the member 14 is constituted by cylindrical facets 24, 26 of selected different radii of curvature. The preselected different radii of curvature of the facets 20, 22 and of the facets 24, 26 are selected to respectively image the nominal man-sized target in the far-field and in the near-field of the field forming mirror assembly 10 with uniform sensitivity.

An infrared detector 28 is mounted concentrically within the field forming mirror member 18 and co-axial with the axis of rotation of the assembly 10. The detector 28 may be any suitable infrared responsive element or combination of elements well-known to those skilled in the art.

A focusing mirror 30 is positioned in spaced relation to the field forming mirror 10 such that the detector 28 is located at the focal point of the focusing mirror 30. The focusing mirror 30 preferably has a spherical surface, although any other suitable geometry such as a paraboloid can as well be employed without departing from the inventive concept.

Referring now to FIG. 3, in the typical case the detector is mounted in a housing generally designated 32 fastened to the ceiling of the region to be protected. The mirrored member 12 cooperates with the focusing mirror 30 to provide a generally curtain-shaped field of view illustrated hatched at 34 that is comparatively broad in elevation as illustrated by an arrow 36 and comparatively-small in azimuth as illustrated by an arrow 38 (FIG. 4). The azimuthal extent of the generally curtain-shaped field of view is controlled by the focal length of the focusing mirror 30. The elevational extent 36 of the curtain-shaped field of view is determined by the curvature and arc-length of the cylindrical facets 20, 22. The front and rear edges of the facets determine the limits or extent of the vertical field of view. The forward edge delimits the lower boundary of the field of view, while the upper boundary of this field of view is determined by the forward edge as shown in FIG. 2. In the illustrated embodiment, the azimuthal divergance 38 is about 5° and the elevational variation of the curtain 34 is about 85°.

The mirror member 14 cooperates with the focusing mirror 30 to provide a second generally curtain-shaped field of view illustrated shaded at 40 (FIG. 3) in a manner identical with that of the field forming mirror member 12, but is not specifically described for brevity of explication. It may be noted that the azimuthal extent of the curtain 40 designated 42 (FIG. 4) is the same as that of the curtain 34, but that its elevational extent in the presently preferred embodiment subtends about 65° of arc as illustrated by an arrow 44 in FIG. 3.

The curtains 34, 40 (FIG. 3) are rotatable through 360° of azimuth independently. As will readily be appreciated, any different azimuthal combination is selected by relatively rotating the field forming mirror members 12, 14 to the corresponding selected azimuthal orientations. Once a particular combination is determined, a threaded fastener, not shown, or any other means can be employed to retain the relatively rotatable field forming mirrors 12, 14 in that selected orientation.

The field forming mirror assembly has been found to substantially eliminate any interference between the separately steerable substantially curtain-like fields of view. A further advantageous feature of the present invention is that the constitutive facets of the relatively rotatable field forming mirrors cooperate with different portions of the field forming mirror 30 so that different elevations within their respective fields of view are imaged with uniform sensitivity for any selected azimuthal orientation.

Figure 5:
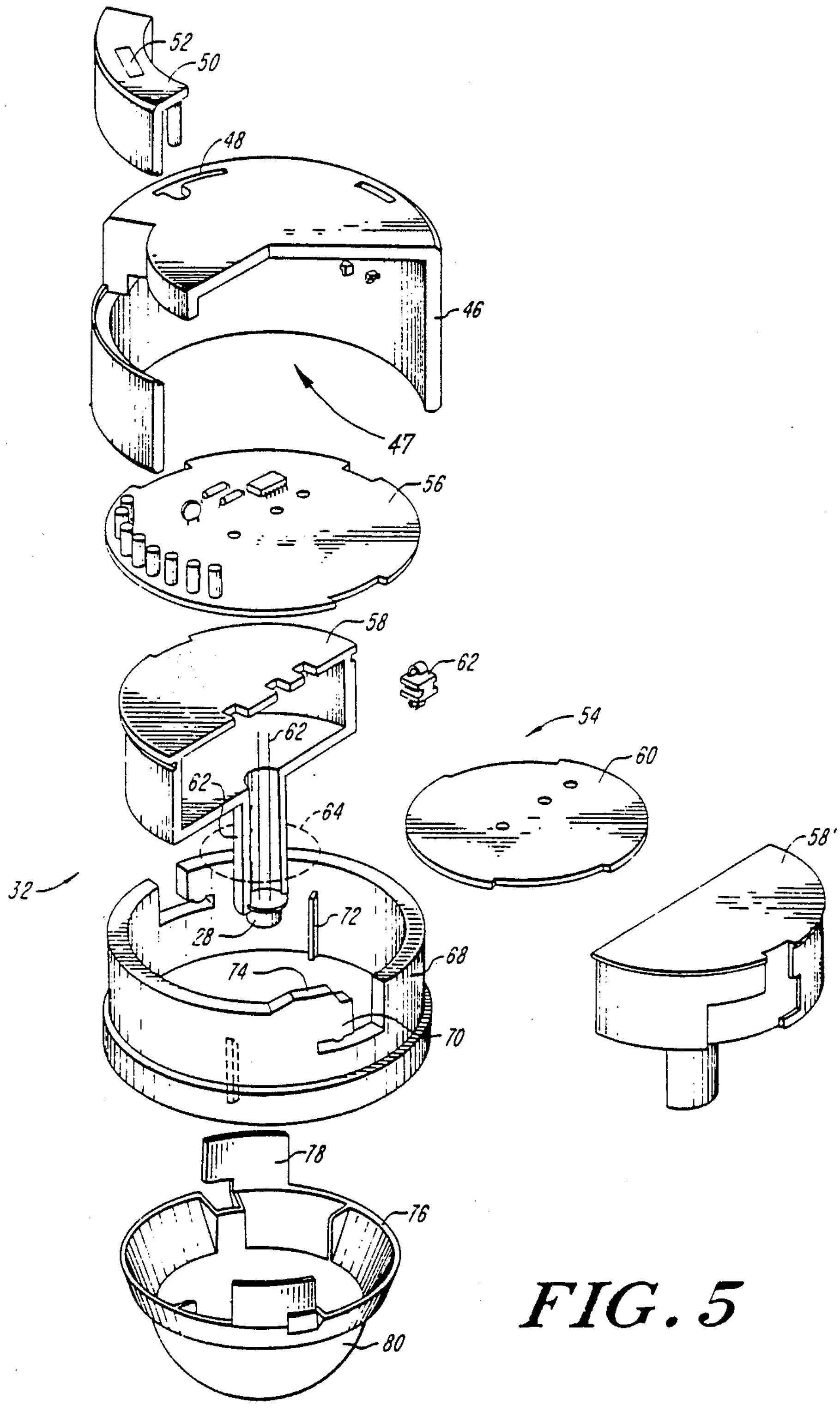
FIG. 5 is an exploded perspective view of the housing of the present invention.

Referring now to FIG. 5, generally designated at 32 is an exploded perspective view of the housing of the present invention. The housing 32 includes a base member 46 adapted for mounting to the ceiling of the region to be protected and defining a chamber generally designated 47 for receiving the steerable mirror assembly of the present invention as well as its associated electronics. The member 46 includes apertures 48 allowing it to be threadably fastened to the confronting wall of the ceiling support structure. A snap-releasable door 50 having an opening 52 therethrough is slidably mounted to an opening provided therefor on the circumference of the member 46 for allowing access to external alarm wiring and internal terminals. The member 46 preferably is fashioned from any suitable plastic or metal material.

An electronics module generally designated 54 is slidably mounted into the chamber 47 defined by the walls of the member 46. The electronics module 54 includes a first printed circuit board 56 externally mounted to a mounting surface of a two-part mateable shield 58, 58', and a printed circuit board 60 mounted within the shield 58, 58'. The two-part shield 58, 58' is fabricated of any suitable metal that provides in well-known manner both electromagnetic shielding for the internal printed circuit board 60 as well as a measure of environmental control therefor. While any suitable means may be provided for electrically interconnecting the printed circuit boards 56, 60, double spring contacts 62 are preferably employed for this purpose. The contacts 62 fit in apertures provided therefor, three being illustrated in position to mechanically and electrically interconnect selected contact points on the boards 56, 60. The two-part shield 58, 58' includes a depending two-part hollow shaft 62 about which the steerable field forming mirror assembly schematically illustrated in dashed line 64 is rotatably mounted. The detector 28 is preferably fastened to the free end of the shaft 62, and it is electrically connected to the electronic circuit boards 56, 60 by wires 66 extending through its hollow interior. The two-part shield 58, 58' is slideably mounted in the member 46, and a locking ring 68, preferably of a plastics material, is slideably mounted in and rotatably fastened thereto by bayonet flanges 70 provided therefor. The locking ring 68 includes radially inwardly projecting locking ribs 72 and and upstanding post 74 provided along its outer perimeter. An infrared transparent dome 76 is slideably inserted in and rotationally retained in the two-part shield 58, 58' via bayonet flanges 78 provided therefor. As schematically illustrated in dashed line 80, the focusing mirror assembly is preferably mounted to the inside wall of the dome 76.

Figure 6:
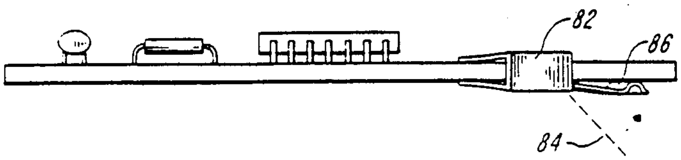
FIG. 6 shows a side elevational view of the tamper switch of the present invention.

With the dome removed, the relatively rotatable mirror members are selectively oriented to provide curtains in an intended azimuthal pattern. Thereafter, the dome is mounted to the peripheral wall of the shield, and the locking ring 68 is rotated such that its locking rib 72 provides an abutment that prevents the counterrotation of the dome. Any unauthorized tampering with the housing will cause the upstanding projection 74 of the locking ring 68 to engage and throw a tamper switch 82 from its nominal position illustrated dashed at 84 to its active position 86 in FIG. 6, and therewith trigger an alarm signal indication of a possible attempt to circumvent the protection afforded by the detector.

It will be appreciated that many modifications of the presently disclosed invention will become apparent to those skilled in the art without departing from the scope of the appended claims.

What is claimed is:

1. A ceiling mountable passive infrared intrusion detection system, comprising:

- a first mirror for focusing radiation incident thereon at a focus;
- a second mirror for providing a curtain-like first field of view that has nominal range, a comparatively narrow azimuthal extent, and a comparatively wide elevational extent, and cooperative with the first mirror for directing the radiation present in the first field of view onto the focus;
- a third mirror for providing a curtain-like second field of view that has a nominal range, a comparatively narrow azimuthal extent, and a comparatively wide elevational extent, and cooperative with the first mirror for directing the radiation present in the second field of view onto the focus;
- means coupled to said second and said third mirrors for mounting said second and said third mirrors for relative rotation about a common axis such that said first and said second fields of view are independently steerable and substantially non-interfering; and
- an infrared detector positioned at the focus of the first mirror and operative in response to the radiation focused thereat to provide an electrical signal representative of intruder presence.

2. The system of claim 1, wherein the first mirror is a focusing mirror having a two-dimensional surface selectively curved along both of the dimensions of the focusing mirror.

3. The system of claim 2, wherein the focusing mirror is spherical.

4. The system of claim 1, wherein said second mirror is a field forming mirror having a preselected non-constant radius of curvature selected to provide uniform detection sensitivity with range.

5. The system of claim 4, wherein said non-constant radius of curvature is constituted as first and second adjacent two-dimensional specular surfaces each selectively curved along only one of the dimensions of each of the two-dimensional surfaces and with a selected different radius of curvature.

6. The system of claim 1, wherein said third mirror is a field forming mirror having a preselected non-constant radius of curvature selected to provide uniform detection sensitivity with range.

7. The system of claim 6, wherein said non-constant radius of curvature of said third field forming mirror is constituted as adjacent two-dimensional surfaces each selectively curved along only one of the dimensions of each of the two-dimensional surfaces and with a selected different radius of curvature.

8. The system of claim 1, wherein one of said second and third mirrors is concentrically disposed inside the other one of said second and third mirrors, and wherein said rotation mounting means includes means for journaling said second and said third mirrors for relative rotation.

* * * * *